United States Patent Office 3,460,957
Patented Aug. 12, 1969

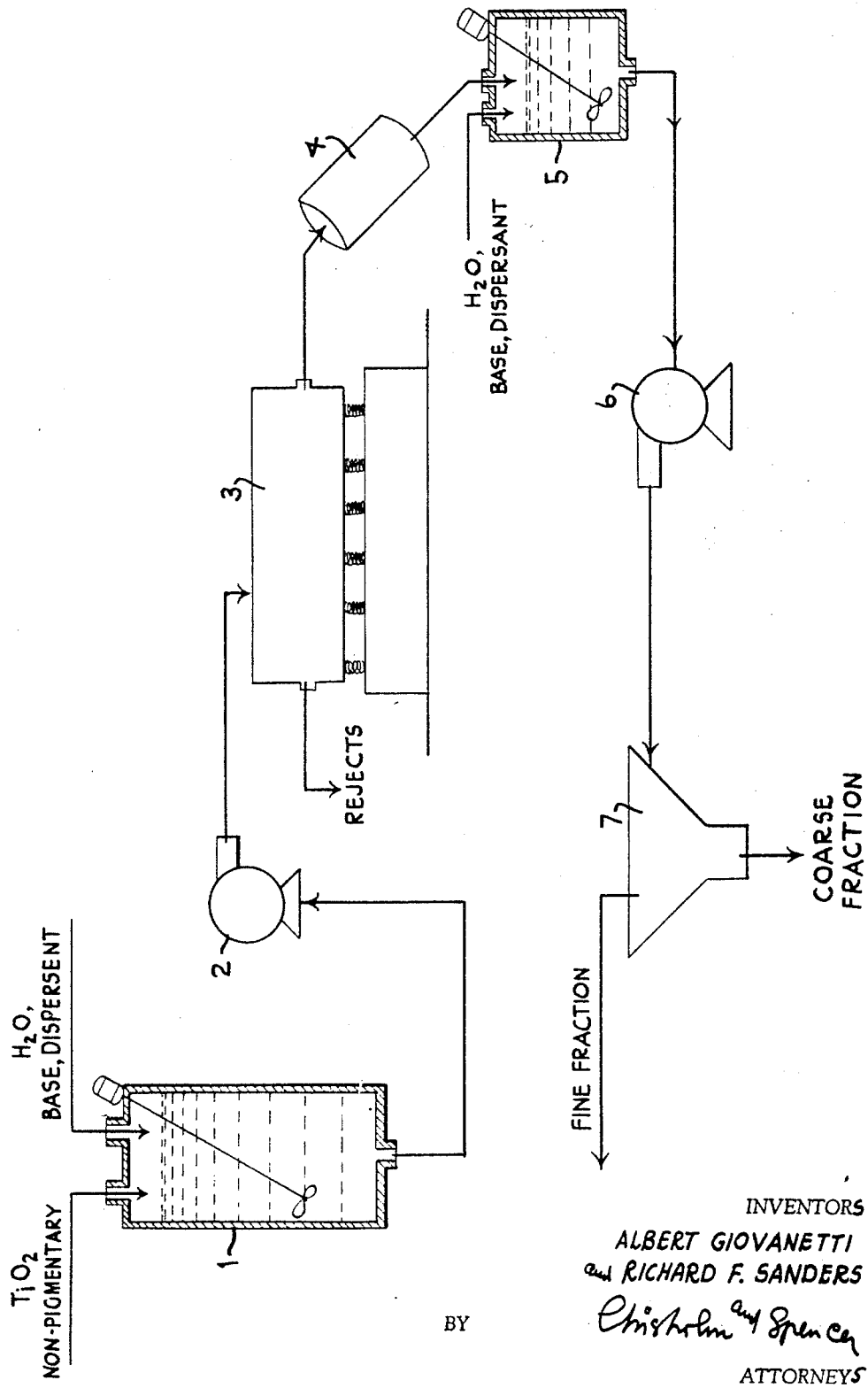

3,460,957
PROCESS FOR RECOVERING PIGMENTARY TITANIUM DIOXIDE FROM NONPIGMENTARY WASTE TITANIUM DIOXIDE
Albert Giovanetti, Moundsville, W. Va., and Richard F. Sanders, Akron, Ohio, assignors to PPG Industries, Inc., Pittsburgh, Pa., a corporation of Pennsylvania
Filed Mar. 18, 1965, Ser. No. 440,839
Int. Cl. C09c *1/36;* C01g *23/00*
U.S. Cl. 106—300                                    4 Claims

ABSTRACT OF THE DISCLOSURE

Pigmentary titanium dioxide is recovered from nonpigmentary, i.e., waste, titanium dioxide, prepared by vapor phase oxidation of titanium tetrahalide by the steps of slurrying the waste product, screening to eliminate coarse material, milling, and hydroclassifying.

---

This invention relates to the production of metal oxide, notably pigmentary metal oxide. More specifically, this invention relates to the recovery of nonpigmentary metal oxide containing at least 90 percent by weight titanium dioxide from a pigmentary titanium dioxide process and the conversion of said nonpigmentary oxide into a pigmentary oxide.

In the production of pigmentary titanium dioxide by a vapor phase oxidation process, at least one titanium tetrahalide selected from the group consisting of $TiCl_4$, $TiBr_4$, and $TiI_4$ is oxidized by reaction in the vapor phase with an oxygenating gas such as oxygen, air, oxides of nitrogen or phosphorus, $H_2O_2$ or mixtures of same in a relatively confined zone maintained at a temperature at which the halide and oxygenating gas react. Where the reactants are, for example, $TiCl_4$ and oxygen, the temperature of reaction is above 800° C., preferably 1000° C. to 1300° C.

Typical processes for the production of pigmentary titanium dioxide within an empty chamber (as distinguished from a chamber containing a fluidized bed) are disclosed in U.S. Letters Patent 2,240,343, issued to Muskat; U.S. Letters Patent 2,394,633, issued to Pechukas et al.; and U.S. Letters Patents 2,968,529 and 3,069,281, issued to William L. Wilson. A typical fluid bed process is disclosed in U.S. Letters Patent 2,760,846.

In the operation of a vapor phase oxidation process, nonpigmentary metal oxide is often produced as an undesirable by-product.

The composition of the nonpigmentary metal oxide will comprise at least 90 percent by weight titanium dioxide and 0.1 to 10.0 percent by weight of at least one other metal oxide. Such other metal oxide will depend upon which particular metal or metals are used to nucleate the oxidation reaction and/or to promote rutile formation. By way of example, there is usually present 0.1 to 10.0 precent by weight of an oxide of at least one metal of the group consisting of aluminum, arsensic, barium, beryllium, boron, calcium, gadolinium, germanium, hefnium, lanthanum, lithium, magnesium, phosphorus, potassium, samarium, scandium, silicon, sodium, strontium, tantalum, tellurium, terbium, thorium, thulium, tin, yttrium, ytterbium, zinc, zirconium, niobium, gallium, or antimony. Other metal oxides may also be present such as iron, mercury, silver, rubidium, nickel, lead, copper, cesium, etc.

In the vapor phase oxidation of a titanium tetrahalide within an empty chamber, the nonpigmentary metal oxide containing at least 90 percent by weight $TiO_2$ commonly forms on the chamber walls and comprises 1 to 10 percent by weight of the total metal oxide (pigmentary and nonpigmentary) produced in the chamber. In a fluidized bed process, for example, as disclosed in U.S. Letters Patent 2,760,846, up to 50 percent by weight of the total metal oxide produced in the bed is nonpigmentary accretion which forms on the bed particles.

Nonpigmentary metal oxide is removed from the reaction chamber wall or walls by means of a ceramic dedusting edge as disclosed in copending U.S. patent application Ser. No. 379,825, filed July 2, 1964, by Donald E. Darr et al., an internally cooled metal cutting edge as disclosed in U.S. Letters Patent 2,805,921, or by other means such as disclosed in U.S. Letters Patents 2,619,434; 2,670,- 272; or 2,670,275.

In a fluidized bed process, nonpigmentary metal oxide accretion is removed from the bed particles by milling, e.g., as disclosed in copending U.S. patent application Ser. No. 126,310, filed July 24, 1961, now U.S. Letters Patent 3,219,468, and copending U.S. patent application Ser. No. 223,555, filed Sept. 13, 1963, now U.S. Letters Patent 3,245,818.

When the process is conducted in an empty chamber in the absence of a fluidized bed, the nonpigmentary metal oxide is preferably collected or accumulated in a discharge hopper at the bottom of the chamber as disclosed in the copending application of Darr et al.

Inasmuch as the nonpigmentary metal oxide may comprise from 1 to 10 percent by weight of the total metal oxide produced in an empty vapor phase oxidation chamber, or as much as 50 percent in a fluidized bed, the economic operation of a commercial plant may be seriously hampered. Accordingly, many prior art processes have been directed to preventing the formation of nonpigmentary metal oxide. However, in the practice of such processes, nonpigmentary metal oxide is still not completely eliminated.

In accordance with this invention, there is provided a process whereby nonpigmentary waste metal oxide material consisting of at least 90 percent by weight titanium oxide is recovered from a vapor phase oxidation process and processed into a useful pigmentary product.

More particularly, there is provided a process whereby nonpigmentary waste metal oxide having a tinting strength of less than 1200, usually less than 1100, and containing at least 90 percent by weight titanium dioxide and 0.1 to 10.0 percent by weight of another metal oxide, preferably $Al_2O_3$, is converted into pigmentary metal oxide having a tinting strength of at least 1400, usually at least 1700.

Reference is made to the accompanying drawing which is a diagrammatical illustration of the process of this invention.

Non-pigmentary metal oxide consisting of 90 percent by weight $TiO_2$ is recovered, e.g., from the walls of a vapor phase oxidation chamber or from fluid bed particles, and is slurried in a slurry tank 1. The slurry is then adjusted to an alkaline pH and pumped via pump 2 to a vibrating separating screen 3. The fines from the screen are passed into a mill 4, diluted in a dilution tank 5, and pumped by means of pump 6 to a centrifugal separator or hydrocyclone 7. The coarse fraction from the separator 7 may be recycled to the slurry tank 1.

The fine fraction from separator 7 may be subject to further processing, for example, classification, wet coating, filtering, washing, drying, and/or milling as disclosed in U.S. Letters Patent 3,146,119, issued to Hartien S. Ritter.

Likewise, both the fine and coarse fractions can be used directly as ceramic or paper grade $TiO_2$ pigment. The coarse fraction from the hydrocyclone unit 7 as well as the rejects from the separating unit 3 can be used directly in the manufacture of glass, and is particularly suited for such use where it contains high $Al_2O_3$ resulting from a process as disclosed in the application of Darr et al., noted hereinbefore.

The aqueous slurry prepared in tank 1 has a metal oxide solids content of 30 to 65 percent by weight, preferably 45 to 55 percent, basis the weight of the slurry, and a temperature of 50 to 125° F. which is maintained throughout the process.

The initial pH of the slurry before adjustment will be less than 5.0 due to the presence of dissolved halogen, e.g., chlorine. The slurry is adjusted to an alkaline pH of about 6.0 to 12.0, preferably 7.5 to 10.0, by the addition of a base and to a viscosity of 100 to 2500 centipoises measured at about 70° F. The actual viscosity range will depend upon the selected pebble material for the milling operation. Thus, if the ball mill is to contain low density porcelain or flint pebbles, the viscosity will range from 600 to 1100 centipoises. For high density porcelain or steel balls, a viscosity of 1700 to 2300 centipoises is desirable. Suitable bases envisioned in the adjusting of the pH and viscosity in the practice of this invention are NaOH, KOH, LiOH, NH$_4$OH, Ca(OH)$_2$, MgOH, BaCO$_3$, K$_2$CO$_3$, NaCO$_3$, KHCO$_3$, NaHCO$_3$, as well as mixtures of same, particularly hydroxide-carbonate mixtures such as NaOH and Na$_2$CO$_3$.

Likewise, one or more dispersants may be added to the slurry in an amount of 0.05 to 0.5 percent by weight basis the metal oxide, preferably 0.1 to 0.3 percent.

Examples of suitable dispersants, not by way of limitation, are primary amines such as ethylene diamine or ethyl amine, secondary amines such as diethanol amine or diethylene triamine, tertiary amines such as pyridine or triethyl amine and quaternary ammonium hydroxide such as benzyl trimethyl ammonium hydroxide. Water soluble phosphates may also be used, particularly the alkali metal phosphates, e.g., hydrous or anhydrous sodium ammonium phosphate, sodium hypophosphate, sodium hypophosphite, sodium monophosphate, sodium diphosphate, sodium tribasic or orthophosphate, sodium metaphosphate, sodium pyrophosphate, sodium phosphate (pyrodisodium), sodium orthophosphate, sodium hexametaphosphate, sodium tetraphosphate, tetrasodium pyrophosphate, sodium tripolyphosphate, as well as the same or similar soluble phosphates of potassium, ammonium, and lithium, particularly the tripolyphosphates, hexametaphosphates, and tetraphosphates. Such dispersants may also be used as a base to adjust the pH and viscosity of the slurry.

The vibrating separating screen 3 preferably has a vertical and lateral vibrating motion and a frequency of vibration of 15 to 25 cycles per second.

The screen is provided with a non-erosive and non-corrosive protective coating, e.g., Teflon, and has a Tyler mesh size of 100 to 180, such that oversized particles in excess of 90 microns in mean diameter are removed.

The slurry from the screen contains at least 40 percent by weight solids, basis the weight of the slurry. Although the solids content will be decreased by the screening out of the rejects, such will not greatly affect the viscosity for milling purposes.

Mill 4 is preferably a sandmill or pebble mill. Where a pebble mill is employed, the pebbles or balls consist essentially of natural stone, porcelain, silica, alumina, flint, stainless steel, or special non-erosive or non-corrosive effected metals. The pebbles or balls have a mean diameter of 1/8 to 3 inches, preferably 1/4 to 1 inch. The mill is preferably lined with an imported or domestic flint or porcelain. The slurry is milled for a period of time sufficient to recover metal oxide particles less than 10 microns. Retention time in the pebble mill is from 5 minutes to 36 hours, usually 8 to 30 hours.

After milling, the slurry is diluted with an aqueous solution such as water, e.g., in tank 5, to a metal oxide solids content of 15 to 25 percent, preferably 18 to 22 percent, basis the weight of the slurry. Additional base and dispersant can also be added.

The diluted slurry is pumped to hydrocyclone unit 7 wherein coarse and fine fractions are separated. The fine overflow fraction has a mean diameter particle size of less than 0.4 micron and comprises 50 to 95 percent by weight of the feed solids to the hydrocyclone unit. The coarse fraction has a mean particle diameter size in excess of 0.55 micron and comprises 5 to 50 percent by weight of the feed solids to the hydrocyclone unit.

The unit 7 has a suitable number of hydrocyclones, each having a diameter of 5 to 15 millimeters, preferably about 10 millimeters. The number of hydrocyclones will depend upon flow rate conditions of the diluted slurry. The hydrocyclones are operated in parallel inside a common housing, and are constructed out of a corrosive-resistant material, such as stainless steel, rubber, or plastic-lined steel.

The metal oxide processed in accordance with this invention characteristically has a tinting strength in excess of 1400 and an oil absorption less than 30, preferably less than 19.

Tinting strength of both the nonpigmentary and pigmentary metal oxide is determined in accordance with A.S.T.M. D–332–26, "1949 Book of A.S.T.M. Standards," part 4, page 31, published by American Society for Testing Material, Philadelphia, Pa. Oil absorption is determined in accordance with A.S.T.M. D–281–31.

EXAMPLE

Two thousand pounds of metal oxide waste from a titanium tetrachloride-oxygen vapor phase reaction zone is collected. The metal oxide has an average tinting strength of about 1000 and an analysis of 95.0 percent by weight TiO$_2$, 4.5 percent by weight Al$_2$O$_3$, and 0.5 percent by weight SiO$_2$, basis the total weight of the metal oxide.

The metal oxide is slurried in water at 70° F. to a concentration of 50 percent by weight metal oxide solids. Sufficient sodium hydroxide is added to adjust the pH of the slurry to 8.0 and a viscosity of 850 centipoises. A dispersant, 0.2 percent by weight sodium hexametaphosphate (basis the total weight of the metal oxide) is added with the sodium hydroxide.

The slurry is then separated on a vertical and lateral vibrating screen having a frequency of vibration of 18 cycles per second and a Tyler mesh size of 100.

The minus 100 fine slurry fraction having a solids content of 43 percent by weight is processed for 24 hours in a pebble mill containing flint pebbles of a mean diameter of 1/2 to 5/8 of an inch.

The milled slurry is hydrocycloned and there is recovered a fine fraction of pigmentary metal oxide consisting essentially of 95.0 percent by weight TiO$_2$ having a mean particle size of 0.28 micron. The tinting strength of the recovered metal oxide is 1600.

The above description of the invention has been given for purposes of illustration and not limitation.

Thus, it will be understood that the invention is in no way to be limited except as set forth in the following claims.

We claim:

1. A process for recovering pigmentary titanium dioxide from nonpigmentary, waste titanium dioxide prepared by vapor phase oxidation of titanium tetrahalide, which comprises the steps of screening an aqueous alkaline slurry of said waste titanium dioxide to remove particles in excess of 90 microns, said slurry having a viscosity of from 100 to 2500 centipoises at 70° F.; milling the fines from the screening step for a period of time sufficient to obtain a milled product wherein the largest particle is less than 10 microns; and hydrocycloning the milled product to recover a fine overflow fraction having a mean diameter particle size less than 0.4 micron.

2. A process according to claim 1 wherein the screened slurry has a solids content of from 30 to 65 percent.

3. A process according to claim 1 wherein the screened slurry has a pH of from 7.5 to 10.

4. A process according to claim 1 wherein milling time is from 5 minutes to 36 hours.

References Cited

UNITED STATES PATENTS

| | | | |
|---|---|---|---|
| 1,937,037 | 11/1933 | Hanahan | 106—300 |
| 2,044,941 | 6/1936 | Hanahan | 106—300 |
| 2,933,408 | 4/1960 | Demister et al. | 106—300 |
| 3,073,092 | 1/1963 | Ancrum | 23—202 |
| 3,245,818 | 4/1966 | Evans et al. | 23—202 |
| 3,287,087 | 11/1966 | Evans et al. | 23—202 |
| 3,342,424 | 9/1967 | Whately et al. | 241—21 |

FOREIGN PATENTS

| | | |
|---|---|---|
| 385,315 | 12/1932 | Great Britain. |
| 926,221 | 5/1963 | Great Britain. |

TOBIAS E. LEVOW, Primary Examiner

H. M. SNEED, Assistant Examiner

U.S. Cl. X.R.

23—202